3,498,806
GLASS COMPOSITIONS AND PROCESS
Friedrich W. Hammer, John Jasinski, and Joseph R. Monks, Jr., Toledo, Ohio, assignors to Owens-Illinois, Inc., a corporation of Ohio
No Drawing. Filed Sept. 7, 1965, Ser. No. 485,539
Int. Cl. C03c 1/10, 3/04, 3/24
U.S. Cl. 106—52                                    15 Claims

ABSTRACT OF THE DISCLOSURE

Highly colored glasses of generally blue or green coloration including such colors as Dark Maryland Blue, Scotch Green, Champagne Green, Cuttysark Green and the like are produced from molten colorless or amber colored flint glasses by the direct addition to the molten glass in the forehearth region of a glass melting furnace of a powdered colorant composed of about 90 percent or more by weight of powdered cobalt oxide and optionally included powdered zinc oxide, alkali and alkaline earth silicate, borate and phosphate wetting agents.

---

This invention relates to the manufacture of colored glasses and more particularly to the manufacture of colored glasses by an improved forehearth powdered colorant addition technique.

Further, this invention relates to novel glass compositions made by adding a powdered colorant to flint and amber glasses.

Accordingly, broadly the invention relates to the production of colored glasses from either colorless or colored base glasses by powdered colorant addition.

Still further, the invention relates to novel colored glasses possessing high ultraviolet-absorbing properties, but meeting commercial standards established for several grades of blue and green colors.

BACKGROUND FOR THE INVENTION: EVOLUTION OF GLASS MAKING

Full melter operation

In the earlier art of making colored glass, it was the practice to add the colorant material to the melter along with other batch materials. Since a glass tank contains 100 tons or more of molten glass in process in order to provide an economical operation, substantial economic problems of loss of both glass and product occurred during a changeover from one color to another. This practice of course meant that only one color of glass could be produced by the furnace at one time and in addition to being inflexible as regards color change, it required an extremely large capital investment for a single color.

Forehearth colorant process

More recently the practice of adding an enriched colorant frit glass to the forehearth has been developed. This practice provides important advantages over the full tank method for producing colored glass. Thus, by the forehearth colorant method, as many colors can be produced simultaneously from a single tank as there are forehearths associated with the tank. Thus, short runs of a single color can be made profitably as distinguished from the prior full melter operation.

Further flexibility is provided by the fact that in a given forehearth a transition from one color to another can be made in the manner of a few hours as contrasted to a matter of several days to change a full melter from one color to another.

Both time economies and reduced loss of glass are readily apparent.

Further, smaller amounts of colorant are required by the forehearth colorant technique than by the full melter process. Thus, in the full melter process the colorant along with the remainder of the batch is subjected to extremely high temperatures in the melting and refining zones and these high temperatures produce substantial losses of the volatile colorant materials during the extended melting and refining operations. Temperatures in the forehearth are substantially lower than in the melting and refining zones, and thus losses by volatilization are less likely to occur by the forehearth colorant process.

Also by operating in accordance with the forehearth addition technique, conditions of firing in the melter and refining zones, rate of batch addition to the melter, and other factors can be stabilized and thereby converted into constants for improved operation and ease of control. Thus careful adjustment and stabilization of tank conditions leads to the production of consistently high quality products. The tank conditions, once stabilized, remain so. This greatly improves the operation over the old full tank color operation where a color change caused all of these factors to be upset.

Further advancement to the art

The forehearth colorant process, although providing a substantial advance to the art still leaves much to be desired from an economy point of view. Thus, it requires the preparation of a frit glass. This is melted in a separate, special furnace at very high temperatures using selected materials and high ratios of colorant. The liquid frit is poured into water after formation to reduce it to granular form. After this is carefully dried, it is then added to a forehearth in carefully metered amounts to produce a colored end product or composite glass from the forehearth.

Frit making and handling and processing are thus expensive and add to capital investment by the extra furnace required, by the special furnace operator, close control, etc.

Nevertheless, by the forehearth technique several approaches have been taken with success because of the economic advantages over the full melter process. These are as follows:

(a) Using a colorless base glass and adding a colorant enriched frit;

(b) Using a colored base glass and enhancing the color by adding more colorant by means of a frit containing the same colorants.

But no one has been able to advance the art to the ultimate by putting colorant into the forehearth in the form of unprocessed powdered oxide, without having to go through the frit process, to produce colored end product glass. In fact, the prior art states that this cannot be done. For example, in U.S. Patent 2,916,387 it is stated at col. 2, lines 14 and following:

"Direct addition of a colorant material such as a colorant metal oxide to the glass in the pool is ineffective, because the oxide does not liquify or dissolve sufficiently rapidly to produce a uniform mixture in the time and space available."

This patent further states the defects that have been encountered with forehearth colorant addition using frits. Thus, the patent continues:

"Compositions comprising a solid glass solution of a colorant, on the other hand, are generally insufficiently concentrated to be effective.

"For use in commercial practice, it is necessary that the colorant material be sufficiently concentrated so that only a relative small volume need be added to the molten glass to attain the requisite depth of coloration. Introduction of a large volume of a solid substance will produce a disadvantageous decrease in the temperature of the molten glass. For proper operation of the forming machinery, the molten glass must be maintained within relatively narrow temperature limits. The heat source provided to maintain the glass temperature in the forehearth, however, is of limited capacity. If substantial amounts of a solid substance such as a colorant composition are introduced into the glass in the forehearth, these heat sources are insufficient to compensate for the consequent drop in temperature. The forming machinery then fails to operate properly."

It is accordingly an important object to provide a process for adding powdered colorant directly to the forehearth, without the necessity of having to go through the expensive process of frit glass forming.

A further object is to provide novel glasses having unexpectedly high ultraviolet ray absorbing properties.

BRIEF INTRODUCTION TO THE INVENTION

The various aspects of this invention are as follows:

(1) The broadest aspect comprises the addition of a selected highly soluble colorant oxide per se to glass in a forehearth. A particularly useful application of this aspect of the invention involves the use of an amber base glass — for unexpected color effects in the composite glasses so produced.

This embodiment also encompasses the use of a powdered solubilizer for the powdered colorant oxide to unexpectedly reduce dusting as the powdered materials are immediately wetted upon contact with the molten mass in the forehearth.

(2) A further important aspect is the novel glass compositions produced by the present invention.

The addition of highly soluble colorant powder

By this invention, a selected oxide has been found to mix unexpectedly well into molten glass in the forehearth and produce uniformly colored ware. Further, this selected oxide has been found to produce unexpectedly good colors of unexpectedly high density in the ware.

The colorant oxide utilized in accordance with the invention is cobalt oxide and in its broadest aspect, no processing of the cobalt oxide is necessary for use.

Within the extended scope of the invention, selected solubilizers or, in effect, high temperature-sensitive wetting agents can be admixed with the colorant oxide powder. The function of these materials is to increase the wetting and solution rate of the colorant cobalt oxide, making it possible to put the cobalt oxide into the forehearth glass at an unexpectedly high rate.

USE OF THE PRESENT INVENTION

Before discussing the specific manner in which the present invention is practiced, a description of suitable base glasses will be provided to serve as appropriate background upon which the invention can be superimposed.

Preparation of base glasses

Colorless flints.

Base flint glasses of the colorless variety that can be used in practicing the present invention may have an analysis of oxides encompassed within the ranges set out below. Generally it will be found that glasses falling within this broad compositional range are soda-lime-flint glasses commonly used for the manufacture of colorless containers such as milk bottles and the like.

Base flint glass compositions

| Constituent: | Percent by weight |
| --- | --- |
| $SiO_2$ | 60–75 |
| $Al_2O_3$ | .3–14 |
| CaO and MgO | 6–15 |
| $Na_2O$ | 7–18 |
| $K_2O$ | 0–5 |
| BaO | 0–5 |
| Se (selenium) | .00025–.00035 |

The following specific examples are theoretical soda-lima-flint batch analyses of colorless base glasses into which the high colorant cobalt oxide of the present invention can be combined to produce composite glasses of blue color.

Specific base glass No. I

| Constituent: | Percent by weight |
| --- | --- |
| $SiO_2$ | 72.01 |
| $Al_2O_3$ | 1.74 |
| $Fe_2O_3$ | .039 |
| $TiO_2$ | .029 |
| CaO | 11.38 |
| MgO | 1.15 |
| $R_2O$ ($Na_2O+K_2O$) | 13.65 |
| Selenium | .00025–.00030 |

Specific base glass No. II

| Constituent: | Percent by weight |
| --- | --- |
| $SiO_2$ | 71.45 |
| $Al_2O_3$ | 1.32 |
| $Fe_2O_3$ | .037 |
| $TiO_2$ | .013 |
| CaO | 8.32 |
| MgO | 5.58 |
| $R_2O$ ($Na_2O+K_2O$) | 13.28 |
| Selenium | .00025–.00035 |

The conditions and procedure for making the above base glasses are found in Table IX B–11, p. 245, "Handbook of Glass Manufacture," Tooley, Odgen Publishing Company, New York, N.Y., 1953.

In accordance with the broad principles of the invention, cobalt oxide can be added to substantially any oxidized glass. Accordingly, the exemplary soda-lime-flint glasses described above are not to be considered limiting on the scope of the invention. They are suggested as appropriate for commercial container production.

Flint-based ambers.—Amber glasses based on flint compositions also can be used in practicing the present invention. These may have oxide contents encompassed within the ranges set out below. Generally it will be found that glasses falling within these compositional ranges are amber colored as commonly used for producing beverage and food containers. These glasses exhibit high absorption capacity for ultraviolet rays, i.e. on the order of 500 m$\mu$ or less, and thus prevent light destruction of the food and beverage content placed within containers made therefrom.

Base amber glasses

| Constituent: | Percent by weight |
| --- | --- |
| $SiO_2$ | 60–78 |
| $Al_2O_3$ | 1–18 |
| CaO | 7–18 |
| MgO | 0–9 |
| $Na_2O$ | 7–16 |
| $K_2O$ | 0–5 |
| $Li_2O$ | 0–3 |
| $R_2O$ ($Na_2O+K_2O+Li_2O$) | 7–24 |
| BaO | 0–3 |
| $Fe_2O_3$ | .04–.5 |
| Sulfides | .004–.050 |

Composite glass production

In the production of glass containers, a base glass is prepared in a melting tank of several hundred tons capacity. The batch ingredients are added at one end of the melting zone and after fusion, flow to the fining zone. The glass is issued out of the fining zone by being run through one or a plurality of forehearths. Each forehearth feeds a container manufacturing machine.

In the forehearth colorant process a frit is metered into the molten glass at the point where the glass flows from the fining zone into the forehearth. This is done by a suitable vibration feeder and hopper apparatus as known in the art.

Also, refractory stirrers are used to mix the colorant into the glass and produce uniformly homogenized color all through the glass so that ware of even color throughout will be produced.

All of the foregoing techniques are known in the art as typified by the Hagedorn Patent No. 3,024,121 dated Mar. 6, 1962.

Generally the melting and fining zones of glass melting furnaces are maintained at substantially higher temperatures than the forehearth. Thus, melting and fining temperatures in the range of 2850–3000° F. are commonly used. These temperatures cause bubbles of occluded gas to be driven out of the melt and this prevents seeds from being formed in the finished ware.

Temperatures in the forehearth however must be reduced substantially to the forming temperature of the glass so that the glass will be sufficiently viscous to form properly in the container blowing machine. If it is too hot, the viscosity will be too low to form a proper gob, and this will prevent formation of a proper parison, and this in turn will prevent formation of a properly blown container.

Forehearth temperatures therefore are generally in the range of 2350° F. down to about the forming temperature of the glass or about 1900 to 2000° F.

It is at least these lower temperatures, or at this point however, that the forehearth addition process of the prior art have often encountered substantial difficulties. Thus the frit glasses often have such high softening and liquidus temperatures that they do not melt readily and do not mix thoroughly at forehearth temperatures. In fact in some chromium frit glasses, actual crystals of chromium have been found in the final ware due to the improper admixing and melting of the high chromium frit with the base glass.

However, by the present invention cobalt oxide has been found to mix and fuse very readily at forehearth temperatures. The stirring means and mixing baffles of the prior art can be used to produce homogeneous admixture of the cobalt oxide powder into the base glass to produce uniformly colored composite glass ware.

Within the scope of the present invention, no particular mesh size is required of the cobalt oxide. As stated above, unprocessed cobalt oxide can be utilized. Within the broad scope of the invention however mesh sizes in the range of −8 to 400 can be employed with mesh sizes of about +50 to +200 mesh being generally preferred.

The only limitation on the cobalt oxide is of course that it should be free of high melting refractory-type impurities.

Rates of addition

In accordance with the present invention, rates of addition for the cobalt oxide will be in the broad range from about .001 to about .25 percent by weight based on the composite glass. Rates in the range from about .01 to about .25 percent by weight are generally preferred inasmuch as the outstanding blue as well as the outstanding green glasses produced fall within these addition levels.

The following examples illustrate some of the several actual runs made in accordance with the present invention.

EXAMPLE I

Colorless flint base glass plugs cobalt oxide

In this example, commercial cobalt oxide was added to a colorless flint glass within the broad formulation range set forth above to provide about 0.2% of cobalt oxide in the composite glass. The addition was made at forehearth operating temperatures. The color obtained was Dark Maryland Blue.

The composite glass had the following theoretical analysis based on the batch.

| Constituent: | Percent by weight |
|---|---|
| $SiO_2$ | 72.01 |
| $Al_2O_3$ | 1.74 |
| $Fe_2O_3$ | .039 |
| $TiO_2$ | .029 |
| CaO | 11.38 |
| MgO | 1.15 |
| $R_2O$ ($Na_2O+K_2O$) | 13.65 |
| Selenium | .00025–.00030 |
| CoO | .2 |

In the above composition, iron was present as a minor impurity in the sand and $TiO_2$ was present as a minor impurity in the $Al_2O_3$.

EXAMPLE II

Colorless flint plus cobalt oxide

In this example, commercial cobalt oxide was also added to a flint glass within the formulation range set forth above to provide about .2 percent cobalt oxide in the composite glass. The addition of the cobalt oxide was made at forehearth operating temperatures. The color obtained was Dark Maryland Blue.

The composite glass had the following theoretical analysis based on the batch.

| Constituent: | Percent by weight |
|---|---|
| $SiO_2$ | 71.45 |
| $Al_2O_3$ | 1.32 |
| $Fe_2O_3$ | .037 |
| $TiO_2$ | .013 |
| CaO | 8.32 |
| MgO | 5.58 |
| $R_2O$ | 13.28 |
| Selenium | .00025–.00035 |
| CoO | .2 |

Examples I and II represent colored glasses that can be made from colorless flint base glasses and cobalt oxide. Within the scope of the invention, composite glasses based on colorless flints are to be encompassed which fall within the following compositional ranges:

| Constituent: | Percent by weight |
|---|---|
| $SiO_2$ | 60–75 |
| $Al_2O_3$ | .3–10 |
| CaO plus MgO | 6–15 |
| $Na_2O$ | 12–18 |
| $K_2O$ | 0–5 |
| BaO | 0–5 |
| Selenium | .00025–.00035 |
| CoO | .005–.25 |

EXAMPLE III

Amber colored flint plus cobalt oxide

In this example, commercial cobalt oxide was added to amber glass at forehearth operating temperatures to provide .1% cobalt oxide in the composite glass. The color obtained was Scotch Green. This is an unexpected color change and apparently arises from the blending of the blue of the cobalt oxide with the amber color produced by the iron sulfide.

The composite glass had the following theoretical analysis based on batch:

| Constituent: | Percent by weight |
|---|---|
| $SiO_2$ | 71.97 |
| $Al_2O_3$ | 1.884 |
| $Fe_2O_3$ | .042 |
| CaO | 11.47 |
| MgO | .11 |
| $Na_2O$ | 14.08 |
| $K_2O$ | .381 |
| Lithium | .001 |
| Sulfides | .014 |
| CoO | .1 |

Example III represents a single colored glass made from an amber flint base glass and cobalt oxide. Within the scope of the invention, composite glasses based on amber base glass are to be encompassed which fall within the following compositional ranges:

| Constituent: | Percent by weight |
|---|---|
| $SiO_2$ | 60–78 |
| $Al_2O_3$ | 1–18 |
| CaO | 7–18 |
| MgO | 0–9 |
| $Na_2O$ | 7–16 |
| $K_2O$ | 0–5 |
| $Li_2O$ | 0–3 |
| $R_2O$ | 7–24 |
| BaO | 0–2 |
| $Fe_2O_3$ | .04–.5 |
| Sulfides | .004–.050 |
| CoO | .005–.25 |

The foregoing examples prove the operability of the present invention and illustrate at least part of the range of colors and color control possible by applying the principles of the invention.

Solubilizers for the colorant powder

As pointed out above, this invention also encompasses the addition of a powdered solubilizer in combination with the powdered colorant oxide to produce an unexpectedly rapid rate of colorant addition. This unexpectedly enhances the rate of cobalt oxide assimilation by the base glass and reduces dusting.

Thus, in accordance with this aspect of the invention, solubilizers selected from the group of alkali and alkaline earth borates, alkali and alkaline earth silicates, and alkali and alkaline earth phosphates can be used. Specific materials include sodium silicate, sodium borate and sodium phosphate, all in powder form. When such a composite powder mixture is introduced into the forehearth of a glass melting furnace, the heat of the forehearth immediately causes the solubilizer to be reduced to a molten condition in surrounding, wetting relationship to the colorant cobalt oxide powder. This immediately wets the cobalt oxide and instantly starts the fusion and admixture of the cobalt oxide into the molten base glass. By the use of suitable stirring equipment, the color is distributed homogeneously throughout the molten base glass and ware of uniform color is readily accomplished.

As an extension of this aspect of the invention, an alkali metal monoxide can be added in small amounts to facilitate the wetting of the cobalt oxide colorant.

The amount of solubilizer

It has been found that an amount of solubilizer based on the amount of cobalt oxide in the range from about .2 to about 10 percent by weight provides a highly useful additive composition.

Losses by volatilization are very slight by operating in accordance with this aspect of the invention; therefore the amount of solubilizer has little if any effect on the final glass composition and its properties.

Reduction of off-gases

Due to the fact that the cobalt oxide is not a reducing agent, off-gasing is reduced as compared to the prior art. In the prior art, when a reducing agent is added to the forehearth, carbon dioxide and other gases that are released remain in the glass as tiny bubbles because forehearth temperatures are not high enough to fine the glass. These tiny bubbles are called seeds and blisters in the finished ware. These are minimized when operating in accordance with the principles of the present invention.

It has been found that any physically occluded gases in the powdered additives are driven off by the temperature existent in the forehearth as the additive is laid upon the surface of the molten glass. This provides a further unexpected advantage in accordance with the present invention.

Achievement of greens from amber

By introducing cobalt oxide into an amber glass in accordance with this invention, dark greens can be readily achieved. These greens include Champagne Green, Cuttysark Green and other very dark greens. This is unique in view of the fact that cobalt is a normally blue-producing oxide.

Extended scope of invention

The foregoing disclosure has been directed to the use of cobalt oxide as an additive because of the unique characteristics of this material. However, within the scope of the invention, certain extensions are encompassed. Thus zinc oxide and zinc oxide-bearing frits can be combined with the cobalt oxide at various concentrations to furnish extended color ranges in greenish yellows, yellow greens, and greens and blues.

When using cobalt oxide alone with an amber glass, the amber color is fixed and the color modification comes about by blending the amber color with the blue provided by cobalt oxide. With the addition of zinc oxide, however, the base amber is also varied. This comes about by the fact that some of the iron sulfide forming the amber color is exchanged to form zinc sulfide which is colorless. This reduces the intensity of the amber color. Then, the addition of the blue of the cobalt oxide provides a great many more possible shades of green.

For example, Champagne Green can be made from a normal amber by using zinc oxide along with the cobalt oxide. By so operating, the zinc oxide takes out some of the amber and the cobalt oxide blue blends with the resultant, lesser intensity amber to provide Champagne Green.

The foregoing principles are substantiated by the results of several runs which are summarized in the following tables.

| Run No. | Percent $Fe_2O_3$ | Percent S | Percent CoO | Dominant wavelength | Percent purity | Percent brightness | Note |
|---|---|---|---|---|---|---|---|
| 513 | .182 | .028 | 0 | 579.8 | 86.6 | 36.1 | Standard amber. |
| 514 | .182 | .028 | .10 | 566.2 | 49.3 | 5.5 | Very dark green. |
| 515 | .182 | .028 | .12 | 570.3 | 61.7 | 8.2 | Do. |

(The above runs illustrate the colors produced by the present invention by adding varying amounts of CoO to standard amber. Greens are produced.)

| Run No. | Percent $Fe_2O_3$ | Percent S | Percent CoO | Dominant wavelength | Percent purity | Percent brightness | Note |
|---|---|---|---|---|---|---|---|
| 500 | .033 | .012 | 0 | 576.0 | 46.6 | 68.9 | Light amber. |
| 501 | .033 | .012 | .02 | 572.6 | 32.1 | 50.1 | Greenish yellow. |
| 502 | .033 | .012 | .04 | 565.2 | 16.1 | 36.6 | Green. |
| 503 | .033 | .012 | .06 | 514.4 | 3.6 | 27.9 | Blue. |
| 504 | .033 | .012 | .08 | 486.3 | 15.1 | 21.1 | Do. |

(The above runs illustrate the unexpected effects obtainable by first modifying a standard amber to reduce the amount of iron sulfide color, and then adding CoO. The colors vary from greenish yellow through blue as the percent of CoO is increased.)

| Run No. | Percent $Fe_2O_3$ | Percent S | Percent CoO | Dominant wavelength | Percent purity | Percent brightness | Note |
|---|---|---|---|---|---|---|---|
| 525 | .130 | .020 | 0 | 578.1 | 75.8 | 50.2 | Light amber. |
| 526 | .130 | .020 | .02 | 575.8 | 67.6 | 36.9 | Greenish yellow. |
| 527 | .130 | .020 | .04 | 573.4 | 58.6 | 27.3 | Yellow green. |
| 528 | .130 | .020 | .06 | 570.3 | 47.5 | 19.5 | Green. |
| 529 | .130 | .020 | .08 | 566.5 | 35.6 | 15.3 | Approaches champagne green. |

(The above runs illustrate further applications of the principles enumerated in the foregoing description. This level of amber color and CoO highlight the yellows and greens that can be produced.)

It is to be understood that the foregoing description is subject to reasonable extensions and that the invention is capable of being practiced and carried out in various ways. The phraseology or terminology employed is for the purpose of description and not of limitation.

What is claimed is:

1. A shaped body of colored glass having the composition:

| Oxide: | Percent by weight |
|---|---|
| $SiO_2$ | 72.01 |
| $Al_2O_3$ | 1.74 |
| $Fe_2O_3$ | .039 |
| $TiO_2$ | .029 |
| CaO | 11.38 |
| MgO | 1.15 |
| $R_2O$ ($Na_2O+K_2O$) | 13.65 |
| Selenium | .00025–.00030 |
| CoO | .2 |

2. A shaped body of colored glass having the composition:

| Oxide: | Percent by weight |
|---|---|
| $SiO_2$ | 71.45 |
| $Al_2O_3$ | 1.32 |
| $Fe_2O_3$ | .037 |
| $TiO_2$ | .013 |
| CaO | 8.32 |
| MgO | 5.58 |
| $R_2O$ | 13.28 |
| Selenium | .00025–.00035 |
| CoO | .2 |

3. A glass having a composition within the range:

| Oxide: | Percent by weight |
|---|---|
| $SiO_2$ | 60–75 |
| $Al_2O_3$ | .3–10 |
| CaO+MgO | 6–15 |
| $Na_2O$ | 12–18 |
| $K_2O$ | 0–5 |
| BaO | 0–5 |
| Selenium | .00025–.00035 |
| CoO | .005–.25 |

4. A glass having the composition:

| Oxide: | Percent by weight |
|---|---|
| $SiO_2$ | 71.97 |
| $Al_2O_3$ | 1.884 |
| $Fe_2O_3$ | .042 |
| CaO | 11.47 |
| MgO | .11 |
| $Na_2O$ | 14.08 |
| $K_2O$ | .381 |
| Lithium | .001 |
| Sulfide | .014 |
| CoO | .1 |

5. A glass having a composition within the range:

| Oxide: | Percent by weight |
|---|---|
| $SiO_2$ | 60–78 |
| $Al_2O_3$ | 1–18 |
| CaO | 7–18 |
| MgO | 0–9 |
| $Na_2O$ | 7–16 |
| $K_2O$ | 0–5 |
| $Li_2O$ | 0–3 |
| $R_2O$ | 7–24 |
| BaO | 0–2 |
| $Fe_2O_3$ | .04–.5 |
| Sulfides | .004–.050 |
| CoO | .005–.25 |

6. In a process for producing colored glass, the steps of: forming a molten body of refined glass from a batch of glass-forming materials in the glass melting and refining zones of a melter at elevated temperatures, flowing the refined glass from the melter into a forehearth, in the forehearth directly adding powdered colorant to the refined glass, the powdered colorant being composed essentially of cobalt oxide in admixture with dry powdered, high-temperature responsive wetting agent and being added in sufficient amount to add cobalt oxide to the refined glass in an amount ranging from about .001 to about .25 percent based on the weight of the glass, mixing the cobalt oxide into the glass to produce homogeneous color throughout the glass, then issuing the molten glass from the forehearth and forming an article from the glass.

7. In a process as defined in claim 6, wherein the powdered colorant oxide consists of at least 90 percent by weight of cobalt oxide powder admixed with a minor amount of a material selected from the group of materials consisting of alkali and alkaline earth silicates, alkali and alkaline earth borates and alkali and alkline earth phosphates.

8. In a process of producing colored glass, the steps of melting a glass having a composition within the range:

| Constituent: | Percent by weight |
|---|---|
| $SiO_2$ | 60–75 |
| $Al_2O_3$ | .3–14 |
| CaO+MgO | 6–15 |
| $Na_2O$ | 7–18 |
| $K_2O$ | 0–5 |
| BaO | 0–5 |
| Se | .00025–.00035 | flowing said molten glass from a melter into a forehearth, in the forehearth, adding a powdered colorant composed of at least 90 percent by weight of cobalt oxide, the powdered colorant being added in an amount sufficient to add 0.001 to 0.25 percent by weight of cobalt oxide to the molten glass, homogenizing the cobalt oxide throughout the molten glass at the forehearth temperatures, and then forming an article from the homogenized glass.

9. In a process of producing colored glass, the steps of: melting an amber glass having a composition within the range:

| Constituent: | Percent by weight |
|---|---|
| $SiO_2$ | 60–78 |
| $Al_2O_3$ | 1–18 |
| CaO | 7–18 |
| MgO | 0–9 |
| $Na_2O$ | 7–16 |
| $K_2O$ | 0–5 |
| $Li_2O$ | 0–3 |
| $R_2O$ ($Na_2O+K_2O+Li_2O$) | 7–24 |
| BaO | 0–3 |
| $Fe_2O_3$ | .04–.5 |
| Sulfides | .004–.050 | flowing said molten glass from the melter into a forehearth, in the forehearth, adding a powdered colorant composed of at least about 90 percent by weight of cobalt oxide and in an amount sufficient to add .001–0.25 percent by weight of cobalt oxide in the molten glass, homogenizing the cobalt oxide throughout the molten glass at the forehearth temperatures, and then forming an article from the homogenized glass.

10. In a process of producing colored glass, the steps of:

forming a molten body of amber colored flint glass containing iron and sulfur, from a batch of glass-forming materials in a melter at elevated temperatures, the melter having a forehearth, flowing refined amber glass from the melter into the forehearth at a temperature less than the fining temperature, the improvement comprising:

adding zinc oxide to the glass in the forehearth to reduce the intensity of the amber color, also adding a powdered colorant composed of at least about 90 percent by weight of powdered cobalt oxide to the glass in the forehearth and in an amount sufficient to provide from 0.001 to .25 percent by weight of cobalt oxide in the glass and to impart green coloration to the glass, mixing the colorant into the molten glass to provide uniform color throughout the mass, and forming an article from the glass.

11. In a process of producing colored glass, the steps of:

forming a molten body of glass from a batch of glass-forming materials in a melter at elevated temperatures, flowing refined glass from the melter into a forehearth at a temperature less than the fining temperature thereof, in the forehearth, adding to the molten glass a powdered colorant consisting essentially of cobalt oxide in admixture with a minor amount of dry powdered high-temperature responsive wetting agent, mixing the powdered colorant into the molten glass to provide homogeneous coloration throughout the mass, then issuing the mixed glass from the forehearth, and forming an article from the glass.

12. In a process as defined in claim 11, wherein the wetting agent is selected from the group of wetting agents consisting of alkali and alkaline earth silicates, alkali and alkaline earth borates and alkali and alkaline earth phosphates.

13. In a process, as defined in claim 10, wherein said colored glass contains from about .033–.182 percent by weight of $Fe_2O_3$ and from about .012–.028 percent by weight of S and from about .02–.12 percent by weight of CoO.

14. In a process of producing colored glass, the steps of:

providing a molten body of glass having a theoretical oxide composition within the following compositional range:

| Constituent: | Percent by weight |
|---|---|
| $SiO_2$ | 60–75 |
| $Al_2O_3$ | .3–14 |
| $CaO+MgO$ | 6–15 |
| $Na_2O$ | 7–18 |
| $K_2O$ | 0–5 |
| $BaO$ | 0–5 | flowing the glass into a glass melting furnace forehearth, adding powdered colorant to the molten glass in the forehearth, said powdered colorant being composed essentially of about 90 percent by weight of cobalt oxide in admixture with about 10 percent by weight of a high-temperature responsive wetting agent and being added in sufficient amount to provide from about .001 to about .25 percent by weight of cobalt oxide in the molten glass, homogenizing the cobalt oxide throughout the molten glass, and then forming an article from the glass.

15. In a process of producing colored glass, the steps of:

providing a molten body of glass having a theoretical oxide composition within the following compositional range:

| Constituent: | Percent by weight |
|---|---|
| $SiO_2$ | 60–75 |
| $Al_2O_3$ | .3–14 |
| $CaO+MgO$ | 6–15 |
| $Na_2O$ | 7–18 |
| $K_2O$ | 0–5 |
| $BaO$ | 0–5 | flowing the glass into a forehearth, adding colorant to the molten glass in the forehearth, said colorant being composed essentially of powdered cobalt oxide and being added in sufficient amount to provide from about .01 to about .25 percent by weight of cobalt oxide in the molten glass, homogenizing the cobalt oxide throughout the molten glass, and then forming an article from the glass.

References Cited

UNITED STATES PATENTS

| 2,923,635 | 2/1960 | Beck et al. | 106—52 |
| 3,024,120 | 3/1962 | Babcock | 106—52 |
| 3,326,702 | 6/1967 | Babcock | 106—52 |
| 3,330,638 | 7/1967 | Brown | 106—52 |

JAMES E. POER, Primary Examiner

PO-1050
(5/69)

UNITED STATES PATENT OFFICE
CERTIFICATE OF CORRECTION

Patent No. 3,498,806      Dated March 3, 1970

Inventor(s)   F. W. Hammer, J. Jasinski and J. R. Monks, Jr.

It is certified that error appears in the above-identified patent and that said Letters Patent are hereby corrected as shown below:

Column 1, line 68 "manner" should be --matter--.
Column 4, line 2 "lima" should be --lime--;
Column 4, line 28 "procedure" should be --procedures--.
Column 5, line 28, delete "least"; line 69, "plugs" should be --plus--.
Column 8, line 34 "ovide" should be --oxide--.
Column 10, line 39 "alkline" should be --alkaline--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents